(12) United States Patent
Varma et al.

(10) Patent No.: US 8,170,618 B1
(45) Date of Patent: May 1, 2012

(54) MEASURING SIGNAL STRENGTH IN A MULTIPLE-INPUT MULTIPLE-OUTPUT ANTENNA ENVIRONMENT

(75) Inventors: Subir Varma, Ashburn, VA (US); Durga Prasad Satapathy, Olathe, KS (US)

(73) Assignee: Clearwire IP Holdings LLC, Bellevue, WA (US)

( * ) Notice: Subject to any disclaimer, the term of this patent is extended or adjusted under 35 U.S.C. 154(b) by 919 days.

(21) Appl. No.: 12/197,745

(22) Filed: Aug. 25, 2008

(51) Int. Cl.
*H04M 1/00* (2006.01)

(52) U.S. Cl. ............... 455/562.1; 455/575.7; 370/334; 375/267

(58) Field of Classification Search ............... 455/422.1, 455/432.1, 434, 435.1, 435.2, 561, 562.1, 455/575.7; 370/310.2, 319–321, 328, 334; 375/267, 299
See application file for complete search history.

(56) References Cited

U.S. PATENT DOCUMENTS

| | | |
|---|---|---|
| 2007/0025293 A1 | 2/2007 | Choi |
| 2007/0140220 A1 | 6/2007 | Doradla et al. |
| 2008/0247351 A1* | 10/2008 | Dankberg et al. ............. 370/316 |
| 2008/0317141 A1* | 12/2008 | Burg et al. ..................... 375/260 |
| 2009/0034448 A1* | 2/2009 | Miller et al. .................. 370/316 |

OTHER PUBLICATIONS

David Gesbert, et al., "From Theory to Practice: An Overview of MIMO Space-Time Coded Wireless Systems," IEEE Journal on Selected Areas in Communications, Apr. 2003, pp. 281-302, vol. 21, No. 3.

* cited by examiner

*Primary Examiner* — Nhan Le
(74) *Attorney, Agent, or Firm* — O'Brien Jones PLLC

(57) ABSTRACT

A wireless communication device is operated in a M by N multiple-input multiple-output (MIMO) mode. M is the number of antennas transmitting to the communication device from a first base station. N the number of receiving antennas and receivers. M and N are integers greater than one. The wireless communication device is operated in an M by N−1 MIMO mode while a first one of the N receiving antennas and a first one of the N receivers receives wireless communication from a second base station.

6 Claims, 5 Drawing Sheets

MEASURING SIGNAL STRENGTH IN A MULTIPLE-INPUT MULTIPLE-OUTPUT ANTENNA ENVIRONMENT

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, carrier modulation, frequency bands of operation, and message formats.

Overview

A method of operating a wireless communication device is disclosed. The wireless communication device is operated in a M by N multiple-input multiple-output (MIMO) mode. M is the number of antennas transmitting to the communication device from a first base station. N the number of receiving antennas and receivers. M is an integer greater than zero. N is an integer greater than one. The wireless communication device is operated in an M by N−1 MIMO mode while a first one of the N receiving antennas and a first one of the N receivers receives wireless communication from a second base station.

A data stream is received from a first base station using M by N MIMO. M is a number of antennas transmitting the data stream to the communication device from the first base station. N is the number of receiving antennas and receivers receiving the data stream. M and N are integers greater than one. The data stream is received from the first base station using M by N−P MIMO. P is an integer greater than zero. An indicator of a signal strength of a second base station as measured by at least one of the N receivers is reported to the first base station. The signal strength of the second base station is measured while the wireless communication device is receiving the data stream using M by N−P MIMO.

A wireless communication device is disclosed. N antennas and N receivers are configured to receive signals from at least one base station transmitting signals from M antennas. The wireless communication device receives a first data stream based on the received signals using M by N MIMO. The wireless communication device receives a second data stream from the first base station using M−Q by N−P MIMO. P is an integer greater than zero. Q is an integer greater than or equal to zero. An indicator of a signal strength of a second base station is measured by at least one of the N receivers while the wireless communication device is receiving the second data stream.

DETAILED DESCRIPTION

Figure 1:
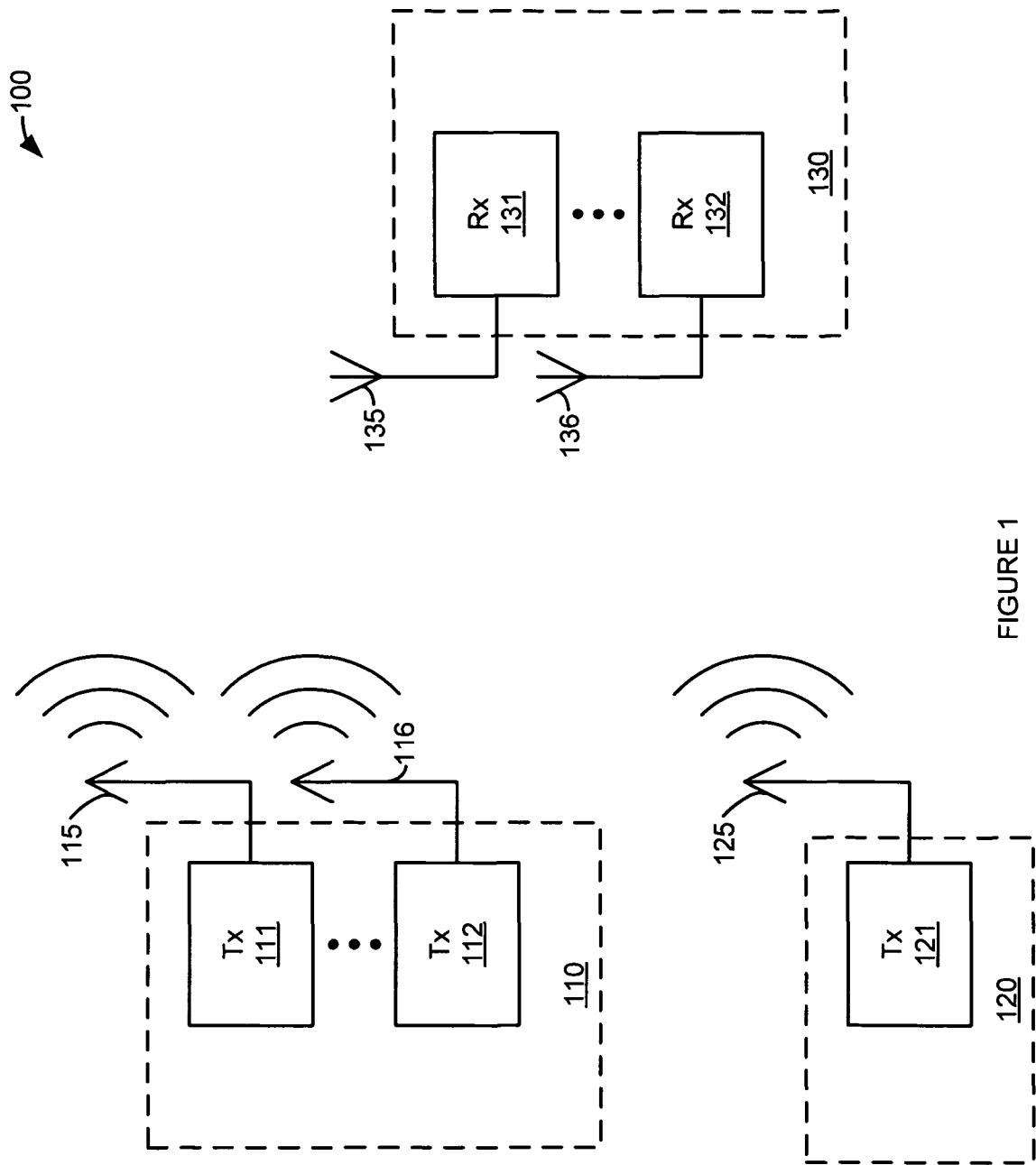
FIG. 1 is a block diagram illustrating a multiple-input multiple-output wireless communication system.

FIG. 1 is a block diagram illustrating a multiple-input multiple-output wireless communication system. In FIG. 1, communication system 100 comprises: base station 110, base station 120, and wireless device 130. Base station 110 includes multiple transmitters. These transmitters are represented in FIG. 1 by transmitter 111 and transmitter 112. Base station 110 includes multiple antennas. These antennas are represented in FIG. 1 by antenna 115 and antenna 116. Antenna 115 and antenna 116 are associated with transmitter 111 and transmitter 112, respectively.

Wireless device 130 may be any device, system, combination of devices, or other such communication platform capable of communicating with base station 110 using multiple receivers 131 and 132 and multiple antennas 135 and 136, respectively. Wireless device 130 may use communication aspects specified by the WiMAX specification including, but not limited to, the MIMO modes detailed therein. Wireless device 130 may be, or comprise, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with base station 110 via multiple antennas 135 and 136. Other types of communication platforms are possible.

Base station 110 may be any wireless system that provides the air interface to wireless device 130 using multiple antennas 115 and 116. Base station 110 may also use one or more transmitters 111 and 112. Base station 120 may be any wireless system that can provide an air interface to wireless device 130. Base station 110 and base station 120 may use communication aspects specified by the WiMAX specification including, but not limited to, the MIMO modes detailed therein. Examples of base stations that may be utilized include, base transceiver stations (BTSs), radio base stations (RBSs), Node B, enhanced Node B (eNBs) and others. Base stations may include a number of elements known to those skilled in the art comprising transceivers, power amplifiers, combiner, duplexer, antennas and control function.

Base station 120 includes at least transmitter 121. Transmitter 121 is associated with antenna 125. Base station 120 may include at least additional transmitters and antennas. Base station 120 may also include other additional components. However, these additional components have been omitted from FIG. 1 for the sake of brevity.

Wireless device 130 includes multiple antennas. Wireless device 130 may include one or more receivers. These receivers are represented in FIG. 1 by receiver 131 and receiver 132. The antennas are represented in FIG. 1 by antenna 135 and antenna 136. In FIG. 1, antenna 135 and antenna 136 are associated with receiver 131 and receiver 132, respectively.

In an embodiment, wireless device 130 is operated in an M by N multiple-input multiple-output (MIMO) mode. M is the number of transmitters 111 and 112 and/or antennas 115 and 116 that base station 110 is using to transmit a data stream to wireless device 130. N is the number of receivers 131 and 132 and/or antennas 135 and 136 that wireless device 130 is using to receive the data stream from base station 110. In an embodiment, M and N may both be two (2). Thus, communication system 100 would be said to be operating in 2×2 MIMO mode. In another embodiment, M=1 and N=2. Thus, communication system 100 would be said to be operating in 1×2 MIMO mode.

In addition to MIMO modes that specify the number of transmitting and receiving antennas, there are MIMO modes that specify how the data stream is transmitted from the multiple transmitting antennas. A first MIMO mode splits a data stream into multiple lower rate data streams and each data stream is transmitted from a different transmit antenna 115 or 116 in the same frequency channel. This mode may be referred to as spatial-multiplexing MIMO (SM-MIMO).

A second MIMO mode transmits multiple redundant copies of a single data stream. The single stream is coded using techniques called space-time coding. The single stream is emitted from each of the transmit antennas 115 and 116 using certain principles of full or near orthogonal coding. This mode may be referred to as diversity coding MIMO or space-time coding MIMO (STC-MIMO).

In an embodiment, base station 110 and wireless device 130 may be operating in an M by N MIMO mode using SM-MIMO. This means that wireless device 130 is receiving M streams of data on a single frequency channel. Wireless device 130 may send a request to base station 110 to switch wireless device 130 from SM-MIMO to STC-MIMO. Wireless device 130 may then receive from base station 110 a control message. This control message may switch wireless device 130 from SM-MIMO to STC-MIMO. Thus, wireless device 130 will begin to receive a single stream of data on a single frequency channel.

In an embodiment, wireless device 130 may determine that it needs to start scanning. Scanning is a process whereby wireless device 130 listens for signals from a second base station 120 while it is still being serviced by a first base station 110. Wireless device 130 then reports this measurement back to the first base station 130. When the strength of the signal from the second base station 120 exceeds the signal strength of the first base station 110, communication system 100 may hand wireless device 130 over to base station 120. Criteria in addition to or as an alternative to signal strength may be utilized to initiate a hand-off from one base station to another base station.

In an embodiment, wireless device 130 is operating in M by N STC-MIMO mode. Wireless device 130 switches to operating in M by N-1 STC-MIMO mode. Wireless device 130 then uses the now extra antenna and receiver for the scanning process.

For example, consider the case where wireless device 130 and base station 110 are operating in 2 by 2 STC-MIMO mode. Thus, transmitters 111 and 112 are both transmitting the same data stream (although with different encodings) via antennas 115 and 116, respectively. Wireless device 130 is receiving the data stream using receivers 131 and 132 via antennas 135 and 136, respectively.

Wireless device 130 may switch to operating in 2 by 1 STC-MIMO mode. Thus, wireless device 130 is receiving the data stream using only receiver 131 and antenna 135. This allows wireless device 130 to use receiver 132 and antenna 136 for scanning. For example, wireless device 130 may use receiver 132 and antenna 136 to measure a signal strength transmitted from base station 120 via transmitter 121 and antenna 125. An indicator of the signal strength may be reported back to base station 110. Based on this indicator of signal strength, communication system 100 may determine that wireless device 130 is to be handed-off to base station 120.

By switching from M by N MIMO to M by N-1 MIMO, wireless device 130 is able to perform the scanning process without disconnecting from base station 110. This helps prevent data traffic from being interrupted during the scanning process. Interrupting data traffic during the scanning process may adversely affect certain communication protocols. For example, interrupting TCP packet flow can trigger the TCP congestion avoidance algorithm. This may result in a reduction of data rate by half or more. In another example, interrupting data traffic associated with a voice over IP (VOIP) flow can increase latency and jitter. This degrades the user experience.

Figure 2:
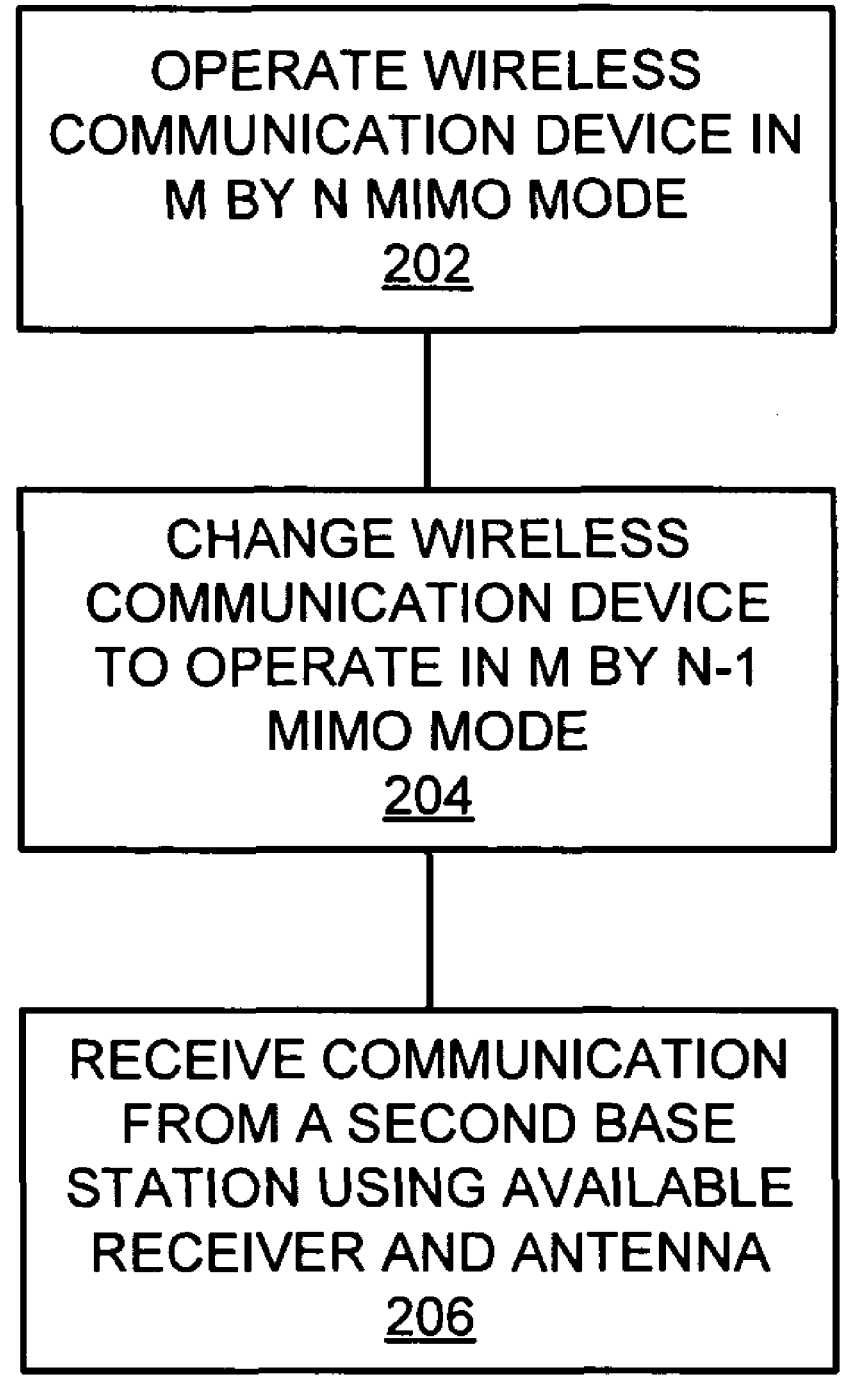
FIG. 2 is a flowchart illustrating a method of operating a wireless communication device.

FIG. 2 is a flowchart illustrating a method of operating a wireless communication device. The steps illustrated in FIG. 2 may be performed by one or more elements of communication system 100.

A wireless communication device is operated in M by N MIMO mode (202). For example, wireless device 130 may be operated in M by N MIMO mode. In another example, wireless device 130 may be operated in 2 by 2 MIMO mode.

The mode of the wireless communication device is changed to operate in M by N-1 MIMO mode (204). For example, the mode of wireless device 130 may be changed to operate in M by N-1 MIMO mode. In another example, the mode of wireless device 130 may be changed to operate in 2 by 1 MIMO mode.

Communication from a second base station is received using an available receiver and antenna (206). For example, wireless device 130 may receive communication from base station 120 using an available receiver 132 and antenna 136. In an example, the available receiver 132 and antenna 136 may be the Nth receiver and antenna that were in use before the switch to M by N-1 MIMO mode. In another example, wireless device 130 may measure, using an available receiver 132 and antenna 136, the signal strength of the received communication from base station 120. In another example, an indicator of the signal strength of the receive communication may be reported to one or more elements of communication system 100.

Figure 3:
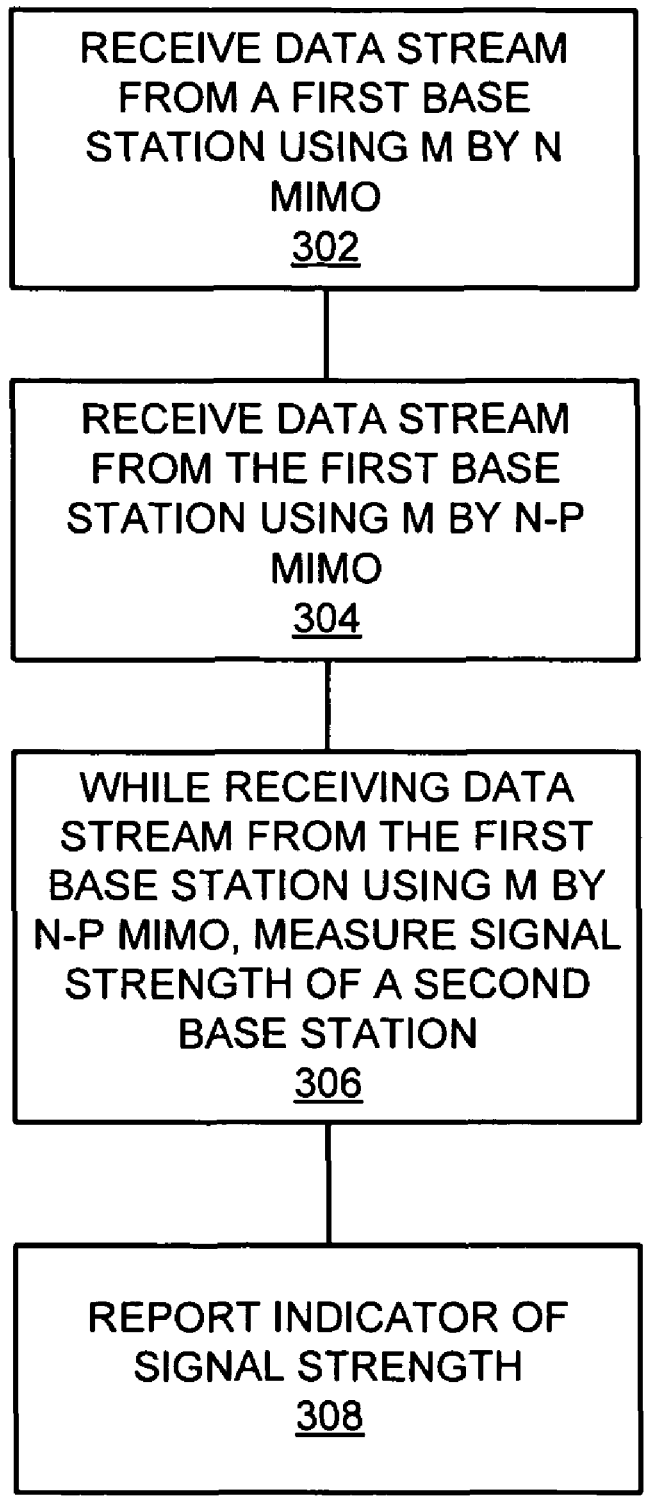
FIG. 3 is a flowchart illustrating a method of operating a wireless communication device.

FIG. 3 is a flowchart illustrating a method of operating a wireless communication device. The steps illustrated in FIG. 3 may be performed by one or more elements of communication system 100.

A data stream is received from a first base station using M by N MIMO (302). For example, wireless device 130 may receive a data stream from base station 110 using M by N MIMO. In another example, wireless device 130 may receive a data stream from base station 110 using 2 by 2 MIMO. In another example, wireless device 130 may receive a data stream from base station 110 using 2 by 2 MIMO as given in the WiMAX specification.

A data stream is received from the first base station using M by N-P MIMO (304). P is an integer greater than zero. For example, if P=2, wireless device 130 may receive a data stream from base station 110 using M by N−2 MIMO. In another example, wireless device 130 may receive a data stream from base station 110 using 2 by 1 MIMO. In another example, wireless device 130 may receive a data stream from base station 110 using 2 by 1 MIMO as given in the WiMAX specification.

While receiving a data stream from the first base station using M by N−P MIMO, a signal strength of a second base station is measured (306). For example, while wireless device 130 receives a data stream from base station 110 using M by N−2 MIMO, wireless device 130 may measure a signal strength of base station 120. In another example, while wireless device 130 receives a data stream from base station 110 using 2 by 1 MIMO, wireless device 130 may measure a signal strength of base station 120 using the receiver and antenna that were formerly used in when wireless device 130 was in 2 by 2 MIMO.

An indicator of signal strength is reported (308). For example, wireless device 130 may report to base station 110 an indicator of the signal strength associated with base station 120. In another example, wireless device 130 may report to base station 120 an indicator of the signal strength that it is experiencing from base station 120.

Figure 4:
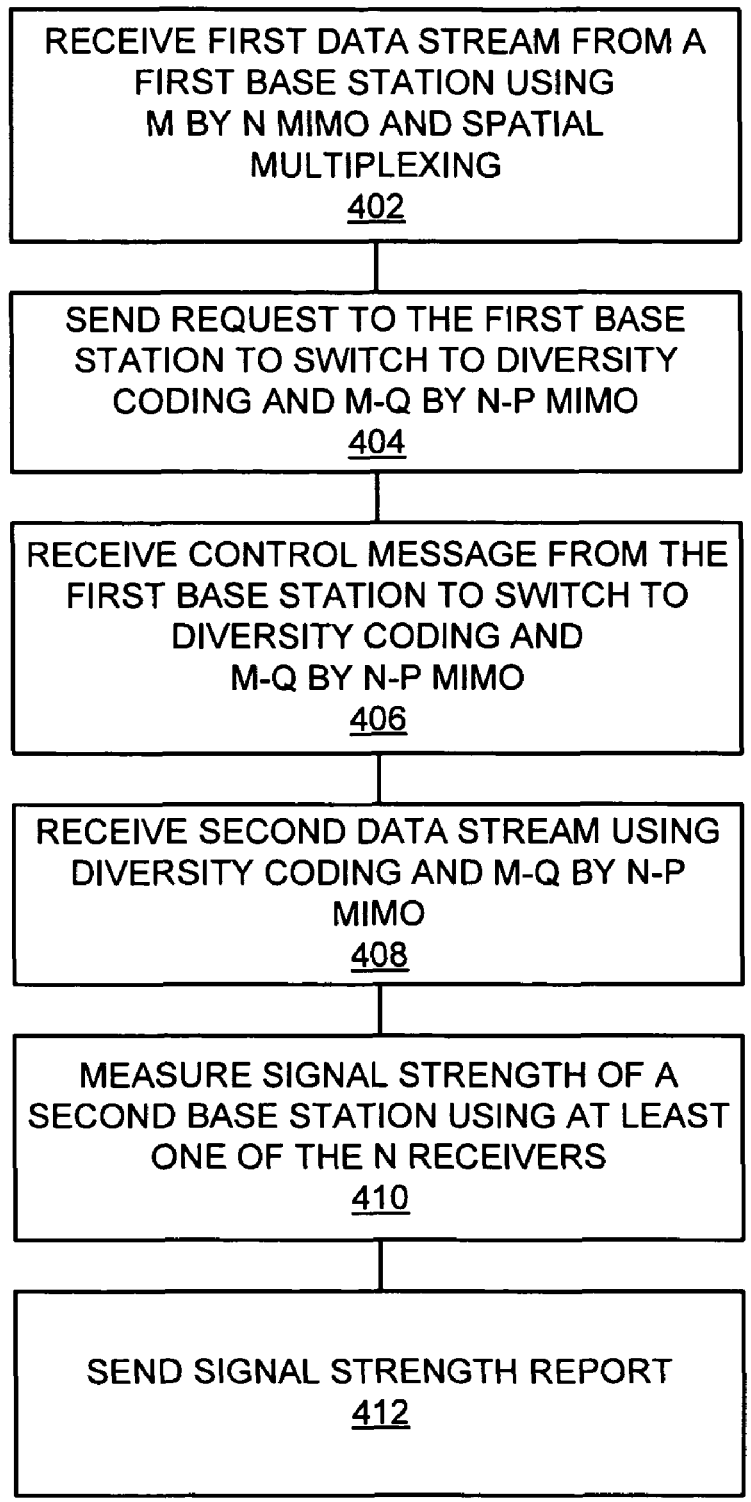
FIG. 4 is a flowchart illustrating a method of operating a wireless communication device.

FIG. 4 is a flowchart illustrating a method of operating a wireless communication device. The steps illustrated in FIG. 4 may be performed by one or more elements of communication system 100.

A first data stream is received from a first base station using M by N MIMO and spatial multiplexing (402). For example, wireless device 130 may receive a first data stream from base station 110 using M by N MIMO and spatial multiplexing. In another example, wireless device 130 may receive a first data stream from base station 110 using 2 by 2 MIMO and spatial multiplexing. In another example, wireless device 130 may receive a first data stream from base station 110 using 2 by 2 MIMO and spatial multiplexing as given in the WiMAX specification.

A request to switch to diversity coding and M−Q by N−P MIMO is sent to the first base station (404). Q is an integer greater than or equal to zero. For example, wireless device 130 may send a request to base station 110 to switch to diversity coding scheme (such as space-time coding) and M−Q by N−P MIMO. In another example, wireless device 130 may send a request to base station 110 to switch to diversity coding and M−1 by N−1 MIMO. In another example, wireless device 130 may send a request to base station 110 to switch to diversity coding and 2 by 1 MIMO.

A control message to switch to diversity coding and M−Q by N−P MIMO is received from the first base station (406). For example, wireless device 130 may receive a control message from base station 110 to switch to diversity coding and M−Q by N−P MIMO. In another example, wireless device 130 may receive a control message from base station 110 to switch to diversity coding and M−1 by N−1 MIMO. In another example, wireless device 130 may receive a control message from base station 110 to switch to diversity coding and 2 by 1 MIMO.

A signal strength of a second base station is measured using at least one of the N receivers (410). For example, wireless device 130 may measure a signal strength of base station 120 using at least one of receiver 131 and receiver 132. In another example, wireless device 130 may measure a signal strength of base station 120 using multiple receivers. In an embodiment, if P is greater than or equal to 2, a signal strength of a base station transmitting in a MIMO mode may be measured by multiple receivers (and antennas). Thus, a MIMO signal strength of the second base station may be measured. For example, if wireless device 130 had at least three receivers (and antennas), and base station 120 was transmitting with at least two transmitters (and antennas), then wireless device 130 could measure the signal strength of base station 120 in 2 by 2 MIMO mode while still communicating with base station 110 in 2 by 1 MIMO mode.

A signal strength report is sent (412). For example, wireless device 130 may send a signal strength report associated with base station 120 to base station 110. In another example, wireless device 130 send a signal strength report to base station 120 indicating of the signal strength that it is experiencing from base station 120.

The methods, systems, transmitter, receivers, and base stations described above may be implemented with, contain, or be executed by one or more computer systems. The methods described above may also be stored on a computer readable medium. Many of the elements of communication system 100 may be, comprise, or include computers systems. This includes, but is not limited to: communication system 100, base station 110, base station 120, and wireless device 130.

Figure 5:
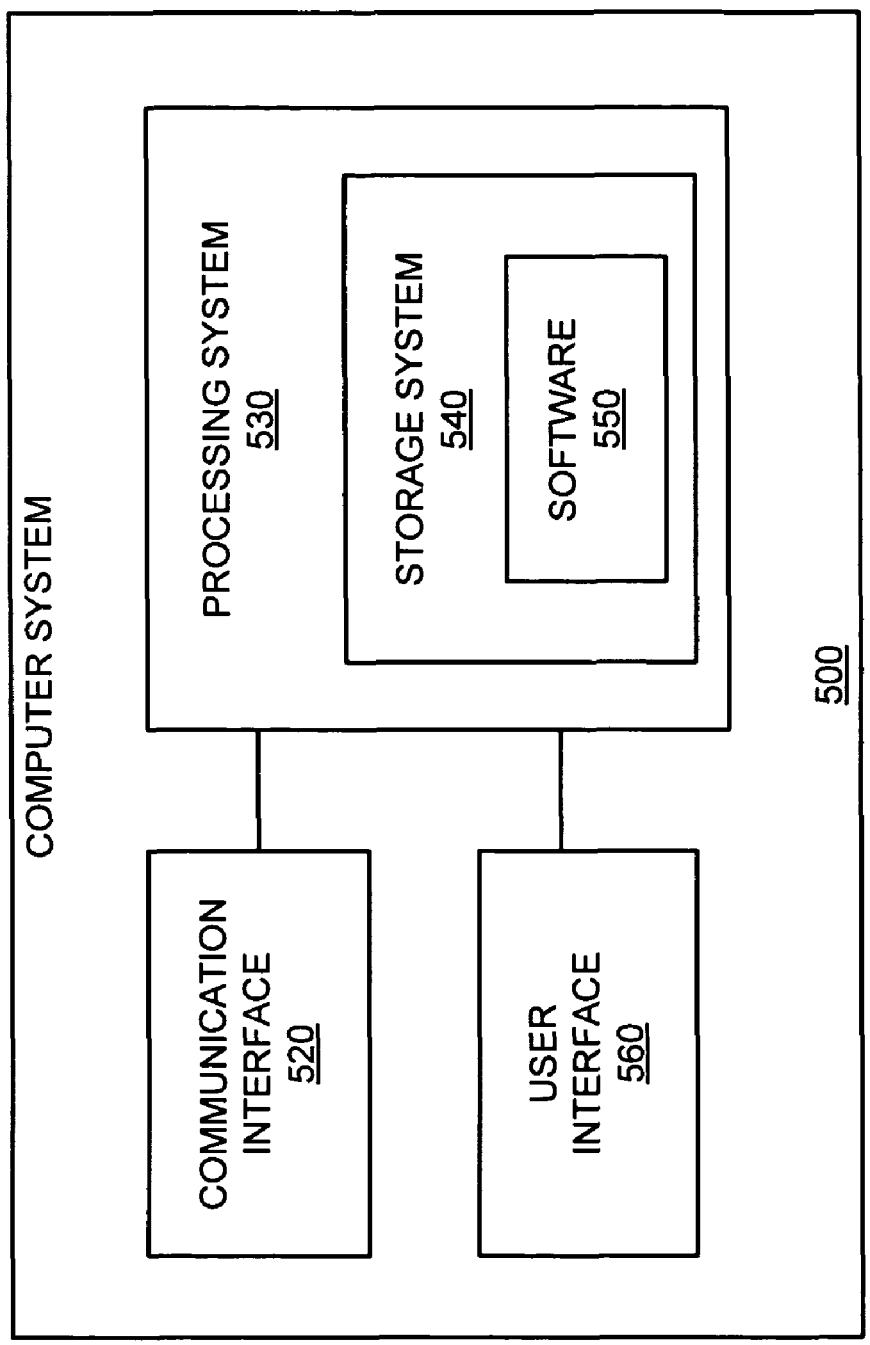
FIG. 5 is a block diagram of a computer system.

FIG. 5 illustrates a block diagram of a computer system. Computer system 500 includes communication interface 520, processing system 530, and user interface 560. Processing system 530 includes storage system 540. Storage system 540 stores software 550. Processing system 530 is linked to communication interface 520 and user interface 560. Computer system 500 could be comprised of a programmed general-purpose computer, although those skilled in the art will appreciate that programmable or special purpose circuitry and equipment may be used. Computer system 500 may be distributed among multiple devices that together comprise elements 520-560.

Communication interface 520 could comprise a network interface, modem, port, transceiver, or some other communication device. Communication interface 520 may be distributed among multiple communication devices. Processing system 530 could comprise a computer microprocessor, logic circuit, or some other processing device. Processing system 530 may be distributed among multiple processing devices. User interface 560 could comprise a keyboard, mouse, voice recognition interface, microphone and speakers, graphical display, touch screen, or some other type of user device. User interface 560 may be distributed among multiple user devices. Storage system 540 could comprise a disk, tape, integrated circuit, server, or some other memory device. Storage system 540 may be distributed among multiple memory devices.

Processing system 530 retrieves and executes software 550 from storage system 540. Software 550 may comprise an operating system, utilities, drivers, networking software, and other software typically loaded onto a computer system. Software 550 could comprise an application program, firmware, or some other form of machine-readable processing instructions. When executed by processing system 530, software 550 directs processing system 530 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication device, comprising:

operating the wireless communication device in a M by N multiple-input multiple-output (MIMO) mode, wherein M is a number of antennas transmitting to the communication device from a first base station, and wherein N a number of receiving antennas and receivers, and wherein M is an integer greater than zero and N is an integer greater than one;

operating the wireless communication device in an M by N−1 MIMO mode while a first one of the N receiving antennas and a first one of the N receivers receives wireless communication from a second base station;

operating the wireless communication device in a MIMO mode wherein a data stream is split into multiple lower rate data streams and each data stream is transmitted from a different transmit antenna in the same frequency channel; and operating the wireless communication device in a space-time coding MIMO mode while scanning for the second base station.

2. The method of claim 1, wherein M=2 and N=2.

3. The method of claim 1, further comprising:

receiving M streams of data on a single frequency channel; and, receiving a single stream of data on the single frequency channel.

4. The method of claim 3, further comprising:

receiving a control message from the first base station to switch the wireless communication device from spatial multiplexing MIMO mode to space-time coding MIMO mode.

5. The method of claim 3, further comprising:

sending a request to the first base station to switch the wireless communication device from spatial multiplexing MIMO mode to space-time coding MIMO mode.

6. The method of claim 5, wherein the wireless communication device begins scanning after the request to the first base station is granted.

* * * * *